(12) United States Patent
Tsai

(10) Patent No.: US 8,302,920 B2
(45) Date of Patent: Nov. 6, 2012

(54) DUAL VACUUM MOUNT TYPE SUPPORT DEVICE

(76) Inventor: Wen-Feng Tsai, Taipei (TW)

( * ) Notice: Subject to any disclaimer, the term of this patent is extended or adjusted under 35 U.S.C. 154(b) by 0 days.

(21) Appl. No.: 12/803,752

(22) Filed: Jul. 6, 2010

(65) Prior Publication Data

US 2012/0006952 A1 Jan. 12, 2012

(51) Int. Cl.
*A45D 42/14* (2006.01)
*F16B 47/00* (2006.01)

(52) U.S. Cl. ............... 248/206.3; 248/205.5; 248/205.7; 248/206.2; 248/206.4; 248/362; 248/363; 248/467; 248/537

(58) Field of Classification Search ............... 248/206.3, 248/205.5, 205.7, 205.8, 206.2, 206.4, 309.2, 248/362, 363, 467, 537; 269/21
See application file for complete search history.

(56) References Cited

U.S. PATENT DOCUMENTS

| | | | | |
|---|---|---|---|---|
| 6,244,553 B1 * | 6/2001 | Wang | ...................... | 248/278.1 |
| 6,502,794 B1 * | 1/2003 | Ting | ...................... | 248/206.2 |
| 6,966,530 B2 * | 11/2005 | Hsu | ...................... | 248/206.2 |
| 7,243,806 B2 * | 7/2007 | Kwok | ...................... | 211/105.3 |
| 7,431,250 B2 * | 10/2008 | Chen | ...................... | 248/205.5 |
| 7,628,364 B2 * | 12/2009 | Chen | ...................... | 248/278.1 |
| 7,641,162 B2 * | 1/2010 | Tsay | ...................... | 248/284.1 |
| 7,665,706 B2 * | 2/2010 | Chien et al. | ...................... | 248/542 |
| 2008/0116337 A1 * | 5/2008 | Kaneda et al. | ........... | 248/205.8 |
| 2008/0197250 A1 * | 8/2008 | Kaneda et al. | ........... | 248/206.3 |
| 2009/0189033 A1 * | 7/2009 | Lin | ...................... | 248/205.5 |
| 2010/0164241 A1 * | 7/2010 | Finck | ...................... | 294/64.1 |

* cited by examiner

*Primary Examiner* — Terrell McKinnon
*Assistant Examiner* — Michael McDuffie
(74) *Attorney, Agent, or Firm* — Jackson IPG PLLC

(57) ABSTRACT

A dual vacuum mount type support device includes a support arm, two vacuum mount assemblies pivotally connected to the two distal ends of the support arm for securing to the flat surface of a support wall and the flat surface of an object to be supported on the support wall, and two pivot locks for locking the vacuum mount assemblies to the support arm in the respective adjusted position.

4 Claims, 3 Drawing Sheets

DUAL VACUUM MOUNT TYPE SUPPORT DEVICE

BACKGROUND OF THE INVENTION

1. Field of the Invention

The present invention to a dual vacuum mount type support device for holding an electronic apparatus or a rack and more particularly, to a dual vacuum mount type support device that has two vacuum mount assemblies pivotally connected to two distal ends of the support arm and lockable by a respective pivot lock such that the two vacuum mount assemblies can be fastened to a flat surface of a furniture or wall and a flat surface of an electronic apparatus for securing the electronic apparatus to the furniture or wall.

2. Description of the Related Art

A hanging support may be installed in a bathroom or inside a car for hanging towels or other things. Regular hanging supports are designed for mounting on a flat wall or planar glass panel, not suitable for installation in a corner area between two abutted walls. Therefore, the application range of conventional hanging supports is limited. Further, vacuum mount type support devices are commercially available. However, conventional vacuum mount type support devices commonly have the drawbacks of complicated structure and high manufacturing cost. Further, it takes much time to assemble the whole assembly.

SUMMARY OF THE INVENTION

The present invention has been accomplished to provide a dual vacuum mount type support device, which eliminates the drawbacks of the prior art design. According to one embodiment of the present invention, the dual vacuum mount type support device comprises two vacuum mount assemblies pivotally adjustably disposed at two distal ends, and two pivot locks for locking the vacuum mount assemblies in the respective adjusted position. Each vacuum mount assembly comprises a vacuum mount base member holding a rubber disk, a vacuum mount cap member, a multilateral upright shaft fastened to the vacuum mount base member and inserted through the vacuum mount cap member, a control device sleeved onto the multilateral upright shaft and stopped at the top side of said vacuum mount cap member and operable to move the multilateral upright shaft relative to the vacuum mount cap member relative in producing a vacuum suction force for securing to a flat surface.

Further, a support arm is coupled between the two vacuum mount assemblies for enabling the vacuum mount assemblies to be respectively locked to the two distal ends of the support arm by the pivot locks.

DETAILED DESCRIPTION OF THE PREFERRED EMBODIMENT

Figure 1:
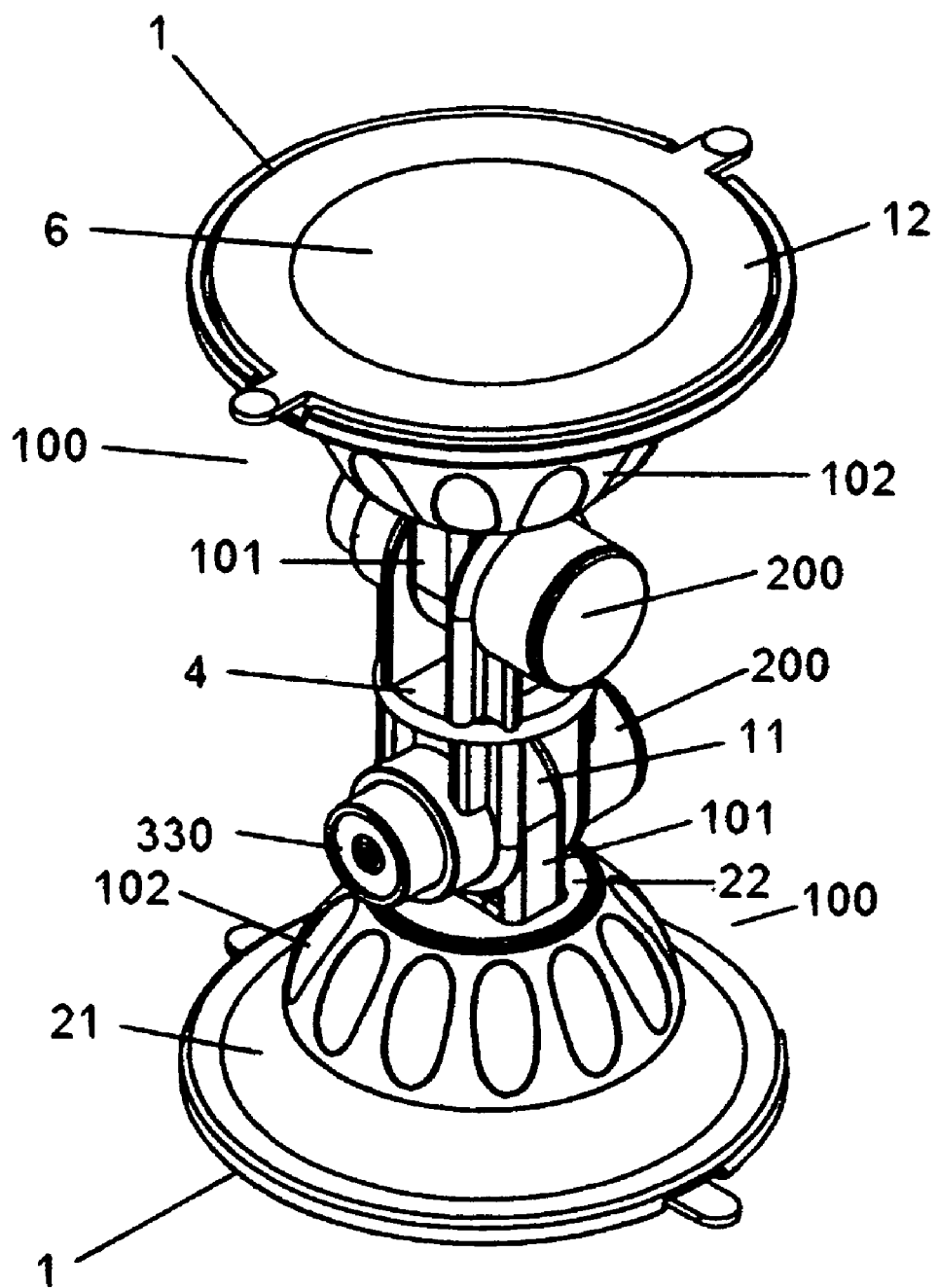
FIG. 1 is an elevational view of a dual vacuum mount type support device in accordance with the present invention.
Figure 2:
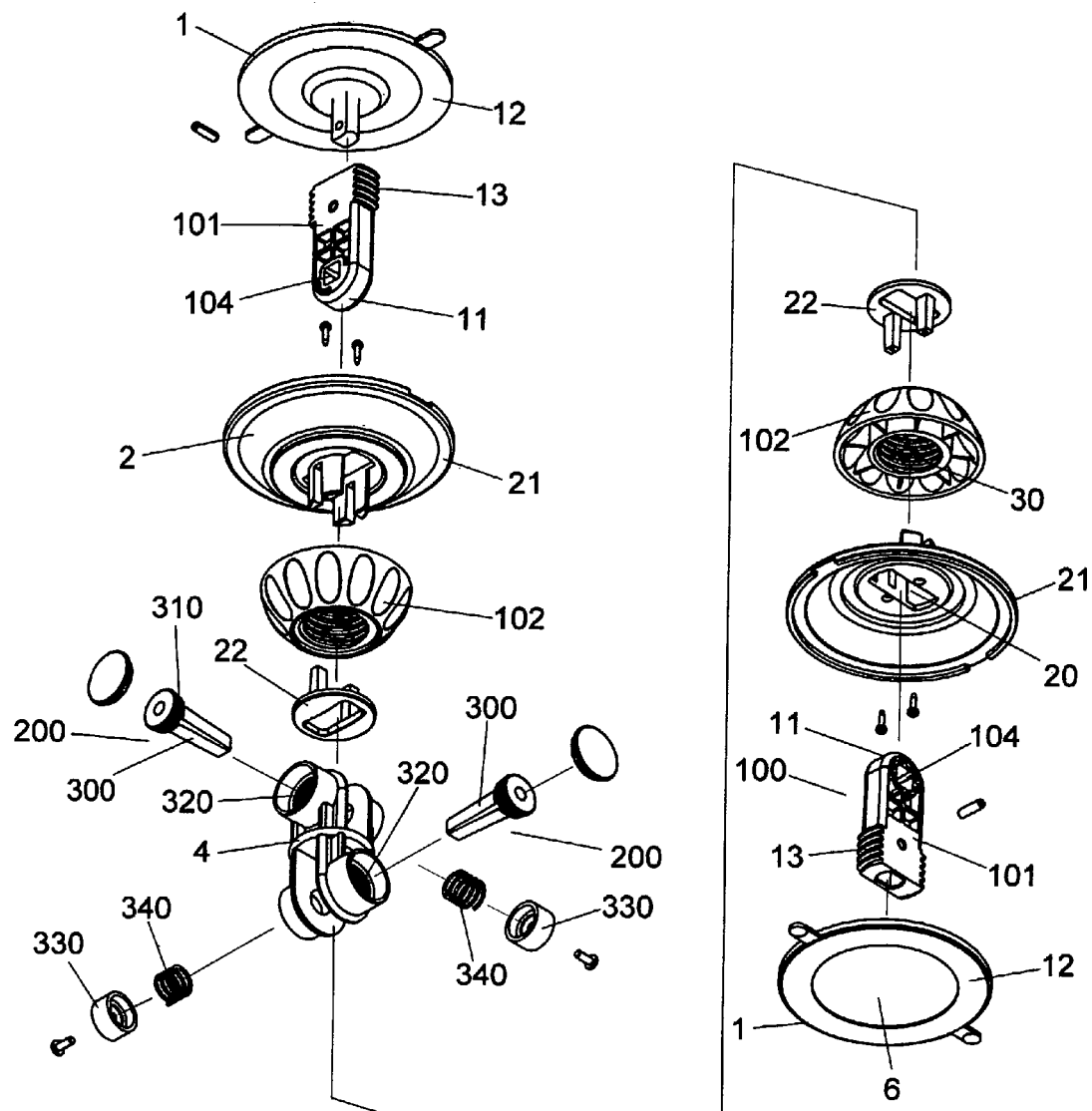
FIG. 2 is an exploded view of the dual vacuum mount type support device shown in FIG. 1.
Figure 3:
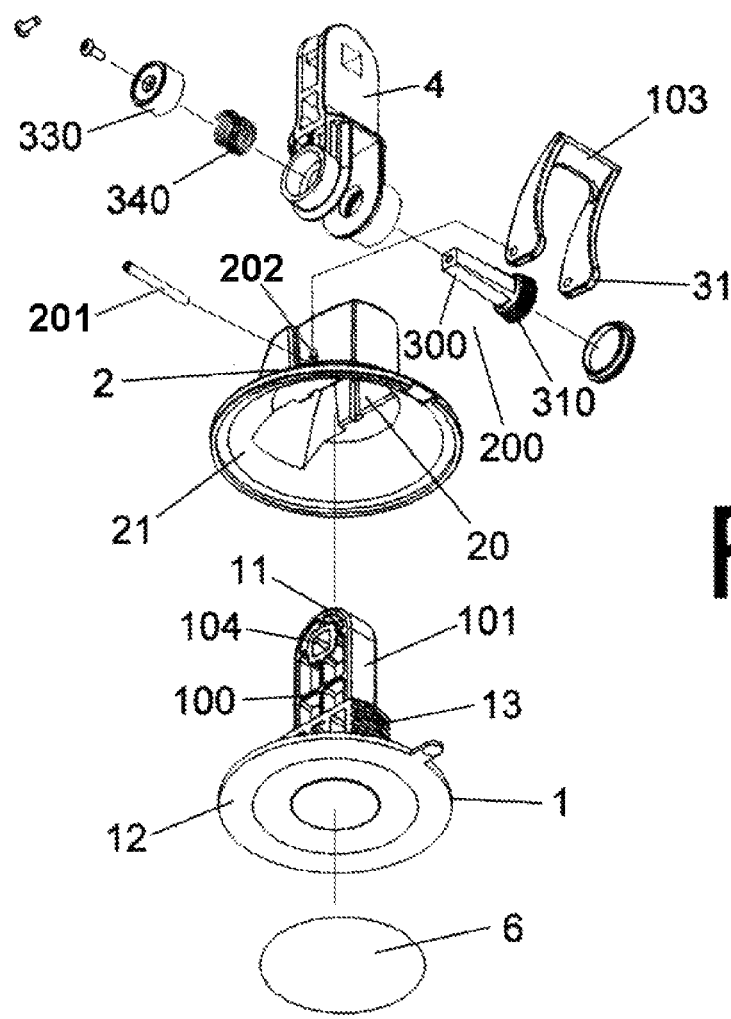
FIG. 3 is an exploded view of an alternate form of the dual vacuum mount type support device in accordance with the present invention.

Referring to FIGS. 1~3, a dual vacuum mount type support device in accordance with a first embodiment of the present invention is shown comprising two vacuum mount assemblies 100 pivotally adjustably disposed at two distal ends thereof and two pivot locks 200 for locking the vacuum mount assemblies 100 in the respective adjusted position.

Each vacuum mount assembly 100 comprises a vacuum mount base member 1 holding a rubber disk 12, a flat polyurethane pad 6 bonded to the bottom side of the rubber disk 12, a vacuum mount cap member 2 having a rigid cup body 21 capped on the vacuum mount base member 1 and a center through hole 20 cut through the center of the rigid cup body 21, a multilateral upright shaft 101 that is fastened to the center of the top side of the vacuum mount base member 1 and inserted through the center through hole 20 of the rigid cup body 21 of the vacuum mount cap member 2 and having an outer thread 13 extending around the periphery of the lower part thereof, a connector 11 located on the top end thereof and a toothed hole 104 transversely cut through the connector 11, a control device 102 sleeved onto the multilateral upright shaft 101 and stopped at the top side of the rigid cup body 21 of the vacuum mount cap member 2 and having an inner thread 30 threaded onto the outer thread 13 of the multilateral upright shaft 101 and a stop member 22 fastened to the vacuum mount cap member 2 to prohibit escape of the vacuum mount cap member 2 from the multilateral upright shaft 101.

In an alternate form of the present invention, as shown in FIG. 3, a locking lever 103 is used to substitute for the aforesaid control device 102. The locking lever 103 has two cam portions 31 pivotally connected to a transverse pivot hole 202 on the top side of the vacuum mount cap member 2 by a pivot 201.

Further, the two vacuum mount assemblies 100 are respectively pivotally connected to two distal ends of a support arm 4 and respectively adjustably locked by the pivot locks 200.

The support arm 4 has a toothed hole 320 transversely formed in each of the two distal ends thereof. Each pivot lock 200 comprises a bolt 300 inserted through the bottom end of the toothed hole 320 at one end of the support arm 4 and the toothed hole 104 of the connector 11 of one vacuum mount assembly 100, a toothed portion 310 located on the periphery of one end (the head) of the bolt 300 and adapted for engaging the teeth (not shown) in the toothed hole 320 and the teeth (not shown) in the toothed hole 104 of the connector 11 of the multilateral upright shaft 101 of the associating vacuum mount assembly 100, a cap nut 330 threaded onto the other end of the bolt 300, and a compression spring 340 sleeved onto the bolt 300 and stopped between the cap nut 330 and the support arm 4.

When the rubber disk 12 (the flat polyurethane pad 6) of the vacuum mount base member 1 of one vacuum mount assembly 100 is attached to a glass or any smooth surface, rotate the control device 102 in direction toward the rubber disk 12 (or biasing the locking lever 103 in one direction) to force the cup-like body 21 against the rubber disk 12, causing a vacuum to be produced in between the glass and the rubber disk 12. Thus, the dual vacuum mount type support device is fastened to the glass. Further, when press the cap nut 330 to move the respective bolt 300, the toothed portion 310 of the bolt 300 is disengaged from the toothed hole 320 of the support arm 4 and the toothed hole 104 of the connector 11 of the associating vacuum mount assembly 100, allowing adjustment of the angle of the support arm 4 relative to the associating vacuum mount assembly 100. When released the hand from the cap nut 330, the bolt 300 is returned into engagement with the toothed hole 320 of the support arm 4 and the toothed hole 104 of the of the connector 11 of the multilateral upright shaft 101 of the associating vacuum mount assembly 100 again subject to the effect of the spring force of the compression member 340.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A dual vacuum mount type support device, comprising:
    a support arm with a first transverse toothed hole formed in each of two opposite distal ends of the support arm;
    two vacuum mount assemblies each pivotally adjustably disposed at two opposite distal ends of the support arm, each vacuum mount assembly comprising:
        a vacuum mount base member holding a rubber disk,
        a vacuum mount cap member,
        a multilateral upright shaft fastened to said vacuum mount base member and inserted through said vacuum mount cap member and comprising a second transverse toothed hole, and
        a control device sleeved onto said multilateral upright shaft and stopped at a top side of said vacuum mount cap member and operable to move said multilateral upright shaft relative to said vacuum mount cap member to produce a vacuum suction force for securing to a respective flat surface; and
    two pivot locks, each pivot lock attached to one of the two opposite ends of the support arm and configured to engage with the respective first transverse toothed hole of the support arm and the second transverse toothed hole of the respective multilateral upright shaft such that each distal end of the support arm is connected to and locking each respective said vacuum mount assembly in a respective adjusted position to secure to one of two different flat surfaces.

2. The dual vacuum mount type support device as claimed in claim 1, wherein each said vacuum mount assembly further comprises a flat polyurethane pad bonded to a bottom side of the rubber disk of the vacuum mount base member thereof.

3. The dual vacuum mount type support device as claimed in claim 1, wherein the multilateral shaft of each said vacuum mount assembly has an outer thread extending around the periphery of a bottom end thereof; the control device of each said vacuum mount assembly comprises a hollow cone nut sleeved onto the associating multilateral upright shaft and stopped at a top side of the associating vacuum mount cap member and threaded onto the outer thread of the associating multilateral upright shaft, and a stop member fastened to the vacuum mount cap member to prohibit escape of the associating vacuum mount cap member from the associating multilateral upright shaft.

4. The dual vacuum mount type support device as claimed in claim 1, wherein the vacuum mount cap member of each said vacuum mount assembly has a transverse pivot hole located on a top side thereof; the control device of each said vacuum mount assembly comprises a locking lever, said locking lever having two cam portions located on two distal ends thereof and stopped at a top side of the respective vacuum mount cap member, and a pivot pivotally connecting said cam portions of said lever to the transverse pivot hole of the associating vacuum mount cap member.

* * * * *